(12) United States Patent
Badyan et al.

(10) Patent No.: US 11,070,632 B2
(45) Date of Patent: Jul. 20, 2021

(54) IDENTIFYING COMPUTING DEVICES IN A MANAGED NETWORK THAT ARE INVOLVED IN BLOCKCHAIN-BASED MINING

(71) Applicant: ServiceNow, Inc., Santa Clara, CA (US)

(72) Inventors: Daniel Badyan, Tel Aviv (IL); Hail Tal, Kohav Yair (IL); Robert Bitterfeld, Petach Tikva (IL); Asaf Garty, Sdei Hemed (IL); Bary Solomon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 98 days.

(21) Appl. No.: 16/163,240

(22) Filed: Oct. 17, 2018

(65) Prior Publication Data
US 2020/0128088 A1    Apr. 23, 2020

(51) Int. Cl.
*H04L 12/24* (2006.01)
*G06F 21/56* (2013.01)
(Continued)

(52) U.S. Cl.
CPC .......... *H04L 67/16* (2013.01); *G06F 16/1824* (2019.01); *G06F 21/56* (2013.01);
(Continued)

(58) Field of Classification Search
CPC ............... H04L 63/14–1491; G06F 21/55–568
See application file for complete search history.

(56) References Cited

U.S. PATENT DOCUMENTS 5,978,594 A    11/1999  Bonnell
6,321,229 B1   11/2001  Goldman
(Continued)

OTHER PUBLICATIONS

Liu, Jingqiang, et al. "A novel approach for detecting browser-based silent miner." 2018 IEEE Third International Conference on Data Science in Cyberspace (DSC). IEEE, 2018. (Year: 2018).*
(Continued)

*Primary Examiner* — David R Lazaro
*Assistant Examiner* — Julian Chang
(74) *Attorney, Agent, or Firm* — Fletcher Yoder PC

(57) ABSTRACT

An example embodiment relates to discovering computing devices in a managed network that are involved in blockchain-based mining. The example embodiment may involve a proxy server application that is disposed within the managed network, controlled by a remote network management platform, and configured to: provide, to a computing device disposed within the managed network, one or more instructions to identify one or more applications executing on the computing device; determine, for an application of the one or more applications that were identified, a command string used to invoke the application to execute on the computing device; compare the command string to a plurality of identifiers indicative of blockchain-based mining; determine that the command string includes an identifier from the plurality of identifiers indicative of blockchain-based mining; and based on determining that the command string includes the identifier, store, in a database, an indication that the application is associated with blockchain-based mining.

19 Claims, 11 Drawing Sheets

(51) Int. Cl.
 *H04L 29/08* (2006.01)
 *G06F 16/182* (2019.01)
 *H04L 29/06* (2006.01)
(52) U.S. Cl.
 CPC ........ *H04L 41/0866* (2013.01); *H04L 63/145* (2013.01); *H04L 63/1408* (2013.01); *H04L 65/1003* (2013.01); *H04L 67/2804* (2013.01)

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,237,008 B1* | 6/2007 | Tarbotton | G06Q 10/107 |
| | | | 709/206 |
| 7,257,842 B2* | 8/2007 | Barton | G06F 21/562 |
| | | | 713/187 |
| 7,325,251 B1* | 1/2008 | Szor | H04L 63/145 |
| | | | 713/165 |
| 7,392,300 B2 | 6/2008 | Anantharangachar | |
| 7,617,073 B2 | 11/2009 | Trinon | |
| 7,685,167 B2 | 3/2010 | Mueller | |
| 7,716,135 B2 | 5/2010 | Angell | |
| 7,716,353 B2 | 5/2010 | Golovinsky | |
| 7,769,718 B2 | 8/2010 | Murley | |
| 7,877,783 B1 | 1/2011 | Cline | |
| 7,925,981 B2 | 4/2011 | Pourheidari | |
| 7,933,927 B2 | 4/2011 | Dee | |
| 7,934,261 B1* | 4/2011 | Saguiguit | G06F 21/565 |
| | | | 726/24 |
| 7,941,506 B2 | 5/2011 | Bonal | |
| 7,945,860 B2 | 5/2011 | Vambenepe | |
| 8,082,222 B2 | 12/2011 | Rangarajan | |
| 8,176,555 B1* | 5/2012 | Schreiner | G06F 21/566 |
| | | | 726/23 |
| 8,346,752 B2 | 1/2013 | Sirota | |
| 8,380,645 B2 | 2/2013 | Kowalski | |
| 8,402,127 B2 | 3/2013 | Solin | |
| 8,402,543 B1* | 3/2013 | Ranjan | H04L 63/1416 |
| | | | 726/23 |
| 8,448,243 B1* | 5/2013 | Sankruthi | G06F 21/562 |
| | | | 726/22 |
| 8,554,750 B2 | 10/2013 | Rangaranjan | |
| 8,555,388 B1* | 10/2013 | Wang | H04L 63/1425 |
| | | | 726/23 |
| 8,612,408 B2 | 12/2013 | Trinon | |
| 8,646,093 B2 | 2/2014 | Myers | |
| 8,683,032 B2 | 3/2014 | Spinelli | |
| 8,738,906 B1* | 5/2014 | Sampath | H04N 21/643 |
| | | | 713/166 |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,906,988 B2 | 12/2014 | Poston | |
| 8,907,988 B2 | 12/2014 | Poston | |
| 9,003,533 B1* | 4/2015 | Gummerman | G06F 21/566 |
| | | | 726/24 |
| 9,015,188 B2 | 4/2015 | Behne | |
| 9,037,536 B2 | 4/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,215,239 B1* | 12/2015 | Wang | G06F 21/566 |
| 9,225,736 B1* | 12/2015 | Roundy | H04L 63/1416 |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,457,344 B2 | 10/2016 | Gere | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,705,919 B1* | 7/2017 | Jacobsen | H04W 12/08 |
| 9,720,709 B1 | 8/2017 | Stickle | |
| 9,742,796 B1* | 8/2017 | Salsamendi | G06F 21/568 |
| 9,762,610 B1* | 9/2017 | Kwan | H04L 63/20 |
| 9,766,935 B2 | 9/2017 | Kelkar | |
| 9,781,151 B1* | 10/2017 | McCorkendale | H04L 63/1408 |
| 9,792,387 B2 | 10/2017 | George | |
| 9,798,878 B1* | 10/2017 | Hittel | G06F 16/148 |
| 9,805,115 B1* | 10/2017 | Satish | G06F 16/35 |
| 9,805,322 B2 | 10/2017 | Kelkar | |
| 9,852,165 B2 | 12/2017 | Morozov | |
| 9,894,099 B1* | 2/2018 | Jacobsen | H04L 63/20 |
| 9,916,448 B1* | 3/2018 | Zhang | G06F 21/564 |
| 9,967,162 B2 | 5/2018 | Spinelli | |
| 9,992,211 B1* | 6/2018 | Viljoen | G06F 21/56 |
| 10,002,203 B2 | 6/2018 | George | |
| 10,044,566 B1 | 8/2018 | Grisco et al. | |
| 10,110,563 B1* | 10/2018 | Ganesh | G06F 16/2282 |
| 10,129,269 B1* | 11/2018 | Ford | G06F 21/57 |
| 10,185,595 B1* | 1/2019 | Ramatchandirane | G06F 9/5061 |
| 10,346,611 B1* | 7/2019 | Mao | H04L 63/1416 |
| 10,482,239 B1* | 11/2019 | Liu | H04L 63/0263 |
| 10,812,521 B1* | 10/2020 | Sharifi Mehr | H04L 63/1433 |
| 2003/0177394 A1* | 9/2003 | Dozortsev | G06F 21/52 |
| | | | 713/187 |
| 2004/0049509 A1* | 3/2004 | Keller | G06Q 10/00 |
| 2004/0268149 A1* | 12/2004 | Aaron | H04L 63/08 |
| | | | 726/11 |
| 2006/0015940 A1* | 1/2006 | Zamir | G06F 21/563 |
| | | | 726/22 |
| 2006/0075468 A1* | 4/2006 | Boney | H04L 63/1408 |
| | | | 726/2 |
| 2006/0075490 A1* | 4/2006 | Boney | G06F 21/566 |
| | | | 726/22 |
| 2006/0075494 A1* | 4/2006 | Bertman | G06F 21/552 |
| | | | 726/22 |
| 2006/0075500 A1* | 4/2006 | Bertman | G06F 21/563 |
| | | | 726/24 |
| 2009/0077664 A1* | 3/2009 | Hsu | G06F 21/566 |
| | | | 726/24 |
| 2011/0016527 A1* | 1/2011 | Yanovsky | G06F 21/566 |
| | | | 726/23 |
| 2011/0167491 A1* | 7/2011 | Ruggerio | G06F 21/552 |
| | | | 726/23 |
| 2013/0054782 A1* | 2/2013 | Huang | H04L 63/12 |
| | | | 709/224 |
| 2013/0191627 A1* | 7/2013 | Ylonen | H04L 63/164 |
| | | | 713/150 |
| 2013/0232540 A1* | 9/2013 | Saidi | H04L 63/10 |
| | | | 726/1 |
| 2013/0305368 A1* | 11/2013 | Ford | G06F 21/566 |
| | | | 726/23 |
| 2014/0013434 A1* | 1/2014 | Ranum | G06F 16/903 |
| | | | 726/24 |
| 2014/0113588 A1* | 4/2014 | Chekina | G06N 20/00 |
| | | | 455/410 |
| 2014/0215557 A1* | 7/2014 | Vishnubhatt | H04L 63/10 |
| | | | 726/3 |
| 2015/0121449 A1* | 4/2015 | Cp | H04L 63/20 |
| | | | 726/1 |
| 2015/0135316 A1* | 5/2015 | Tock | G06F 21/56 |
| | | | 726/23 |
| 2015/0135317 A1* | 5/2015 | Tock | G06F 21/56 |
| | | | 726/23 |
| 2015/0254555 A1* | 9/2015 | Williams, Jr. | G06N 3/0454 |
| | | | 706/14 |
| 2015/0304337 A1* | 10/2015 | Nguyen-Tuong | G06F 21/51 |
| | | | 726/1 |

(56) References Cited

U.S. PATENT DOCUMENTS

| | | | |
|---|---|---|---|
| 2016/0036837 A1* | 2/2016 | Jain | H04L 63/1416 726/23 |
| 2016/0063282 A1* | 3/2016 | Shani | G06F 9/38 717/121 |
| 2016/0261624 A1* | 9/2016 | Berger | G06F 21/554 |
| 2016/0328742 A1* | 11/2016 | Shiravi Khozani | G06Q 30/0248 |
| 2016/0350165 A1* | 12/2016 | LeMond | G06F 21/316 |
| 2017/0078336 A1* | 3/2017 | Aluvala | H04L 12/4633 |
| 2017/0093867 A1* | 3/2017 | Burns | H04L 63/107 |
| 2017/0171229 A1* | 6/2017 | Arzi | H04L 63/1408 |
| 2017/0193229 A1* | 7/2017 | RoyChowdhury | G06F 21/564 |
| 2017/0262629 A1* | 9/2017 | Xu | H04L 63/1425 |
| 2017/0264626 A1* | 9/2017 | Xu | H04L 63/145 |
| 2017/0310687 A1* | 10/2017 | Sun | H04L 63/1416 |
| 2017/0345109 A1* | 11/2017 | Cejnar | G09B 7/00 |
| 2017/0372071 A1* | 12/2017 | Saxe | G06F 21/567 |
| 2018/0020003 A1* | 1/2018 | Ruiz | H04L 63/101 |
| 2018/0054493 A1* | 2/2018 | Heilpern | H04L 67/04 |
| 2018/0075240 A1* | 3/2018 | Chen | G06F 21/554 |
| 2018/0091526 A1* | 3/2018 | Cammarota | H04W 4/70 |
| 2018/0097787 A1* | 4/2018 | Murthy | H04L 63/0236 |
| 2018/0097788 A1* | 4/2018 | Murthy | H04L 63/102 |
| 2018/0097789 A1* | 4/2018 | Murthy | H04L 63/0227 |
| 2018/0097840 A1* | 4/2018 | Murthy | H04L 63/02 |
| 2018/0225447 A1* | 8/2018 | Pintiysky | G06F 21/566 |
| 2018/0239902 A1* | 8/2018 | Godard | G06F 21/552 |
| 2018/0255074 A1* | 9/2018 | Li | G06F 21/50 |
| 2018/0278647 A1* | 9/2018 | Gabaev | G06F 21/52 |
| 2018/0278648 A1* | 9/2018 | Li | H04L 63/101 |
| 2018/0307833 A1* | 10/2018 | Noeth | H04L 43/028 |
| 2018/0314846 A1* | 11/2018 | Schultz | G06F 9/45558 |
| 2019/0007433 A1* | 1/2019 | McLane | G06F 21/561 |
| 2019/0007434 A1* | 1/2019 | McLane | G06N 3/0454 |
| 2019/0065744 A1* | 2/2019 | Gaustad | G06F 21/562 |
| 2019/0095615 A1* | 3/2019 | Pintiysky | G06F 21/566 |
| 2019/0188384 A1* | 6/2019 | Tanda | G06F 21/554 |
| 2019/0215301 A1* | 7/2019 | Abdulhayoglu | H04L 63/1425 |
| 2019/0236270 A1* | 8/2019 | Yamane | G06F 9/45533 |
| 2019/0238565 A1* | 8/2019 | Wang | G06F 21/564 |
| 2019/0238566 A1* | 8/2019 | Wang | H04W 12/1208 |
| 2019/0260795 A1* | 8/2019 | Araiza | H04L 41/22 |
| 2019/0268305 A1* | 8/2019 | Xu | H04L 63/20 |
| 2019/0278909 A1* | 9/2019 | Saxe | G06F 21/567 |
| 2019/0306719 A1* | 10/2019 | Chari | G06F 21/554 |
| 2019/0318100 A1* | 10/2019 | Bhatia | H04L 63/1425 |
| 2019/0364057 A1* | 11/2019 | Hazay | H04L 63/145 |
| 2020/0004960 A1* | 1/2020 | Karasovsky | G06F 21/56 |
| 2020/0004961 A1* | 1/2020 | Prokudin | G06F 21/562 |
| 2020/0021620 A1* | 1/2020 | Puratheppparambil | H04L 63/205 |
| 2020/0034483 A1* | 1/2020 | Zhang | G06F 16/95 |
| 2020/0034489 A1* | 1/2020 | Liu | H04L 63/08 |
| 2020/0036685 A1* | 1/2020 | Liu | H04L 63/0209 |
| 2020/0050762 A1* | 2/2020 | Sathyanarayana | G06F 16/14 |
| 2020/0050773 A1* | 2/2020 | Schroeder | H04L 67/303 |
| 2020/0067945 A1* | 2/2020 | Compton | H04L 63/02 |
| 2020/0067970 A1* | 2/2020 | Compton | H04L 63/02 |
| 2020/0120110 A1* | 4/2020 | Stokes, III | G06N 3/04 |

OTHER PUBLICATIONS

D. Draghicescu, A. Caranica, A. Vulpe and O. Fratu, "Crypto-Mining Application Fingerprinting Method," 2018 International Conference on Communications (COMM), Bucharest, 2018, pp. 543-546, doi: 10.1109/ICComm.2018.8484745. (Year: 2018).*

A. Zareh and H. R. Shahriari, "BotcoinTrap: Detection of Bitcoin Miner Botnet Using Host Based Approach," 2018 15th International ISC (Iranian Society of Cryptology) Conference on Information Security and Cryptology (ISCISC), Tehran, 2018, pp. 1-6, doi: 10.1109/ISCISC.2018.8546867. (Year: 2018).*

Jan D'Herdt, "Detecting Crypto Currency Mining in Corporate Environments", SANS Institute InfoSec Reading Room, Jan. 26, 2015, 27 pages.

Le Jamtel Emilien: "Swimming in the Monero pools", 2018 11th International conference on IT Security incident Management & IT Forensics, IEEE, May 7, 2018, pp. 110-114 (XP033434018).

Extended European Search Report for European Patent Application No. 19203295.1 dated Mar. 13, 2020, 10 pgs.

Examination Report for Australian Application No. 2019250167 dated Feb. 26, 2021, 6 pages.

* cited by examiner

```
[proxy_app@computing_device_1]: ps

PID         USER        START       COMMAND

1           ROOT        12:38       sys_program_1

2           ROOT        12:38       sys_program_2

3           USER_1      12:39       program_1

4           USER_1      12:40       program_2 -n bc.mining.pool.com:3333

...         ...         ...         ...

1150        USER_1      1:35        program_30
```

FIG. 7

```
[proxy_app@computing_device_1]: netstat

Proto      Local Address           Foreign Address        State           PID

TCP        0.0.0.0:135             *:*                    LISTEN          1

TCP        171.14.225.18:10077     11.76.543.21:3333      ESTABLISHED     4

...        ...                     ...                    ...             ...

TCP        144.167.1.100:2900      *:*                    LISTEN          90
```

FIG. 8

IDENTIFYING COMPUTING DEVICES IN A MANAGED NETWORK THAT ARE INVOLVED IN BLOCKCHAIN-BASED MINING

BACKGROUND

Remote network management platforms allow computer networks to be managed by way of cloud-based devices and services. Advantageously, these architectures simplify the provisioning and operation of managed networks, including computing devices, software applications, and configurational relationships therebetween present in such managed networks. These different aspects of managed networks may be identified by discovery operations carried out across computing devices within the managed network.

SUMMARY

A managed network may at times encounter issues in which malicious or otherwise undesirable software applications ("applications," for short) are installed and executed on computing devices in the managed network. An example of such an application is used for blockchain-based mining, such as cryptocurrency mining. Blockchain-based mining can be a computationally complex and intensive process and can involve frequent transmission of large amounts of data to and from the computing device on which such an application is executing. Thus, such an application may consume a large portion of the computing device's local processing resources and cause the computing device to consume a large portion of network bandwidth. This may be particularly problematic when multiple computing devices in the managed network are executing such applications, thereby even further increasing processing and bandwidth consumption.

To address this issue, the methods and systems described herein provide improvements to existing discovery processes by using aspects of discovery to identify computing devices within a managed network that are involved in blockchain-based mining.

Accordingly, a first example embodiment may involve a method performed by a proxy server application disposed within a managed network, where the proxy server application is controlled by a remote network management platform associated with the managed network. The method may involve providing, to a computing device disposed within the managed network, one or more instructions to identify one or more applications executing on the computing device. The method may also involve determining, for an application of the one or more applications that were identified, a command string used to invoke the application to execute on the computing device. The method may also involve comparing the command string to a plurality of identifiers indicative of blockchain-based mining. The method may also involve determining that the command string includes an identifier from the plurality of identifiers indicative of blockchain-based mining. The method may also involve based on determining that the command string includes the identifier, storing, in a database disposed within the remote network management platform, an indication that the application is associated with blockchain-based mining.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

A fifth example embodiment may involve another method performed by a proxy server application disposed within a managed network, where the proxy server application is controlled by a remote network management platform associated with the managed network. The method may involve providing, to a computing device disposed within the managed network, one or more instructions to identify information related to one or more communication sessions active on the computing device, where the communication sessions are between the computing device and respective server devices, and where the information specifies network addresses of the respective server devices. The method may also involve comparing the network addresses to a plurality of identifiers indicative of blockchain-based mining. The method may also involve determining that a network address of the network addresses is included in an identifier of the plurality of identifiers. The method may also involve providing, to the computing device, one or more instructions to identify one or more applications executing on the computing device. The method may also involve determining that the information related to the one or more communication sessions includes a reference to an application of the one or more applications executing on the computing device, where the application is associated with a communication session involving the network address. The method may also involve based on determining that the information related to the one or more communication sessions includes a reference to the application, storing, in a database disposed within the remote network management platform, an indication that the application is associated with blockchain-based mining.

In a sixth example embodiment, an article of manufacture may include a non-transitory computer-readable medium, having stored thereon program instructions that, upon execution by a computing system, cause the computing system to perform operations in accordance with the fifth example embodiment.

In a seventh example embodiment, a computing system may include at least one processor, as well as memory and program instructions. The program instructions may be stored in the memory, and upon execution by the at least one processor, cause the computing system to perform operations in accordance with the fifth example embodiment.

In an eighth example embodiment, a system may include various means for carrying out each of the operations of the fifth example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts an example operating system shell instruction, in accordance with example embodiments.

FIG. 8 depicts another example operating system shell instruction, in accordance with example embodiments.

DETAILED DESCRIPTION

Figure 1:
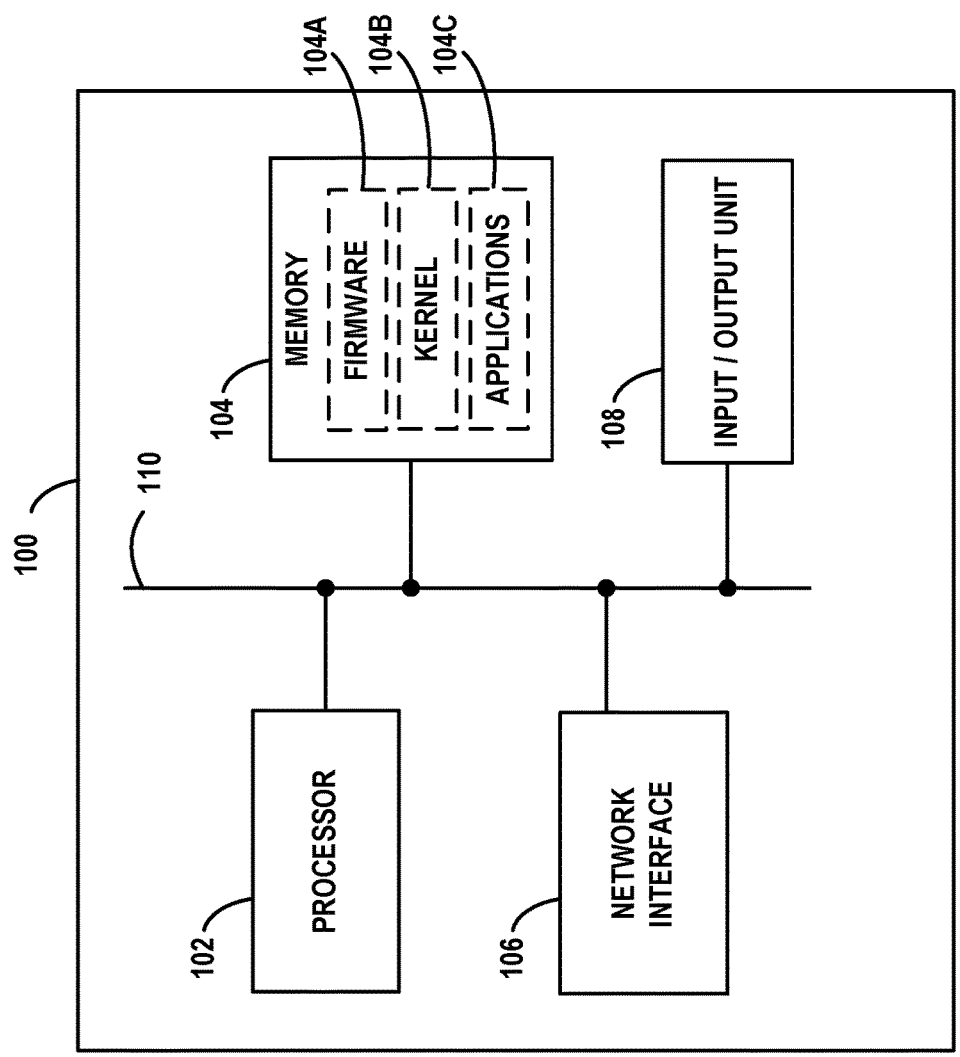
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
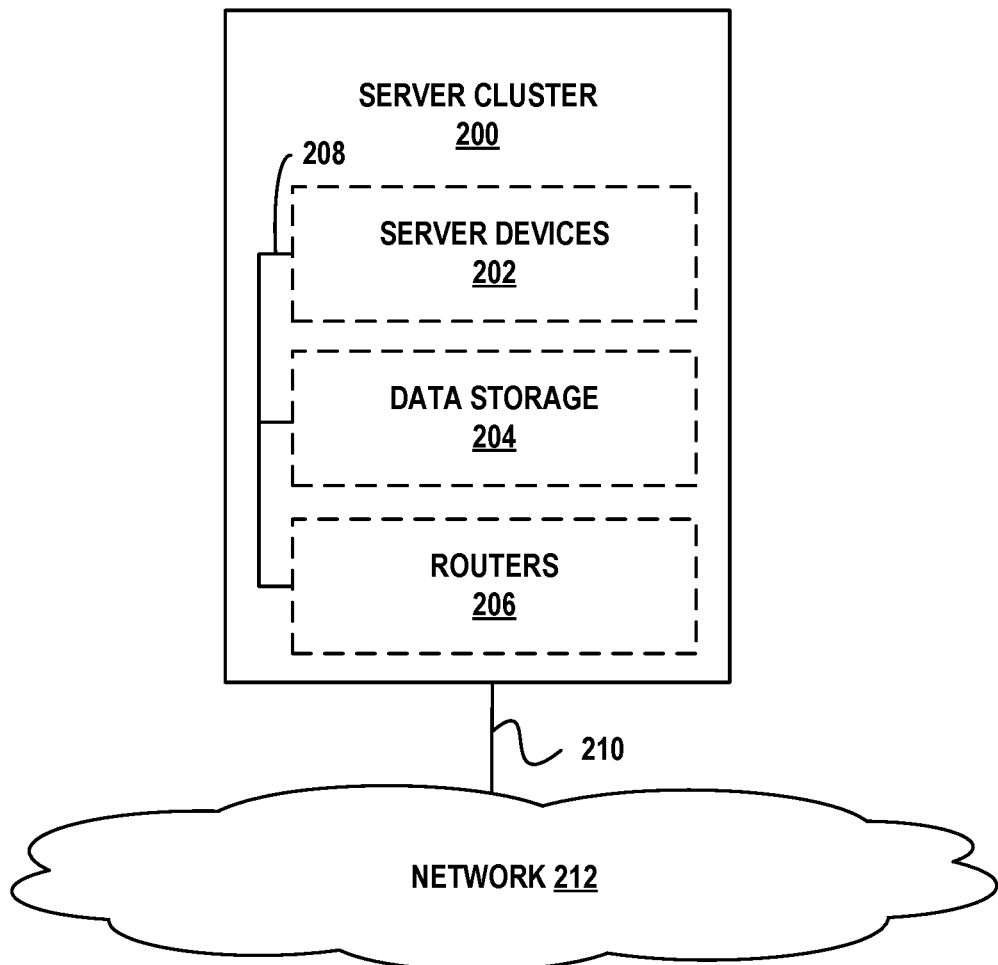
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
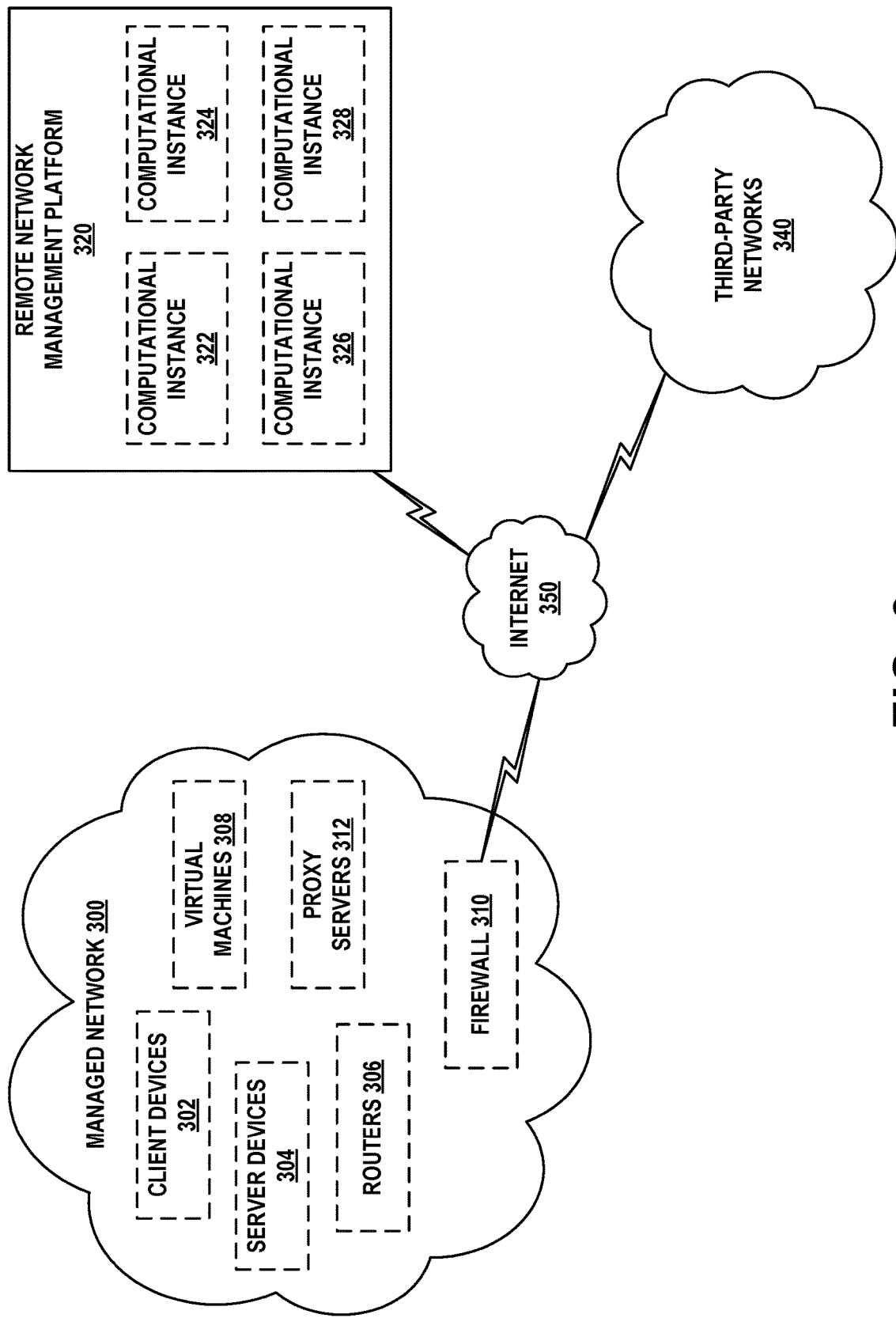
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
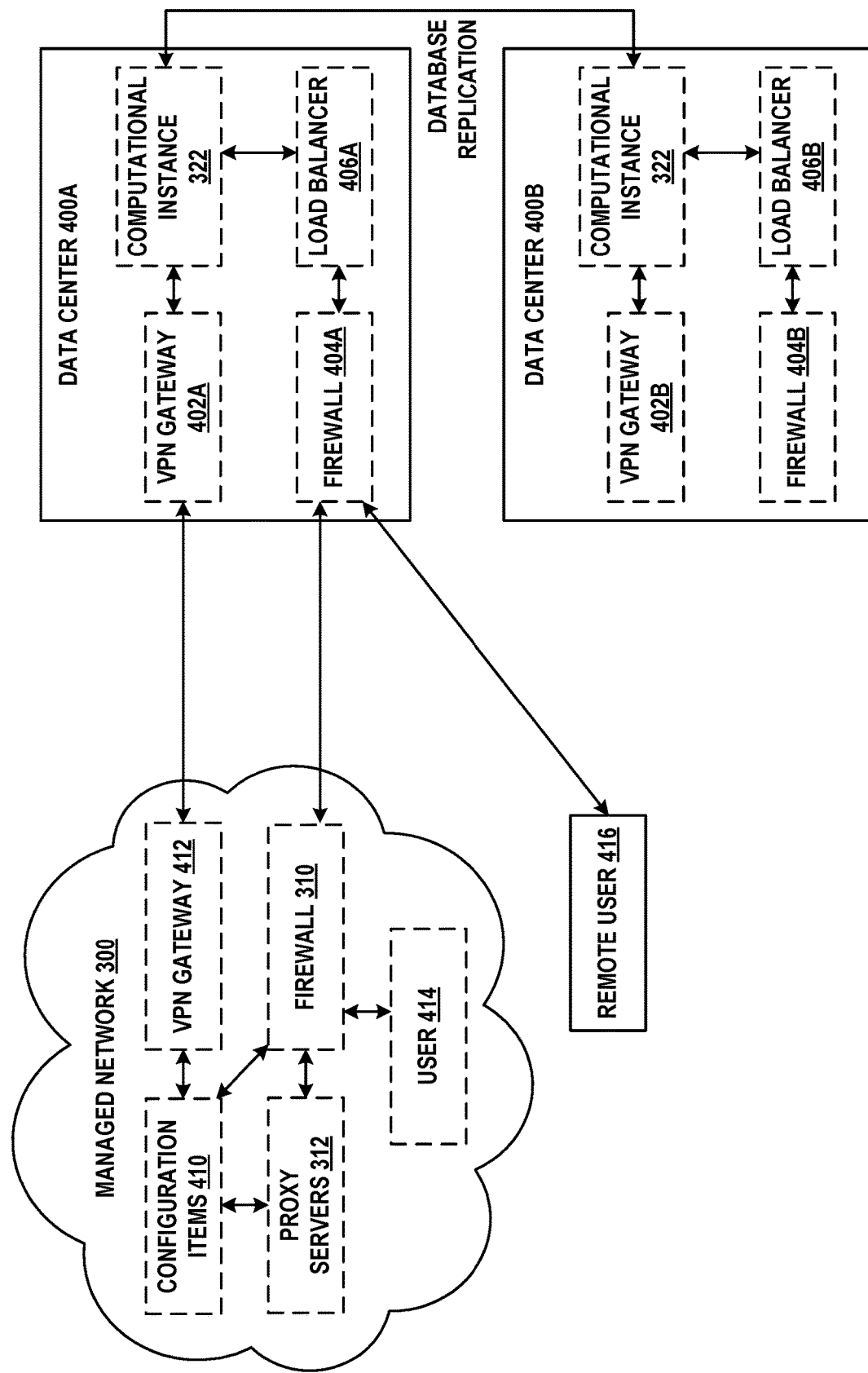
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
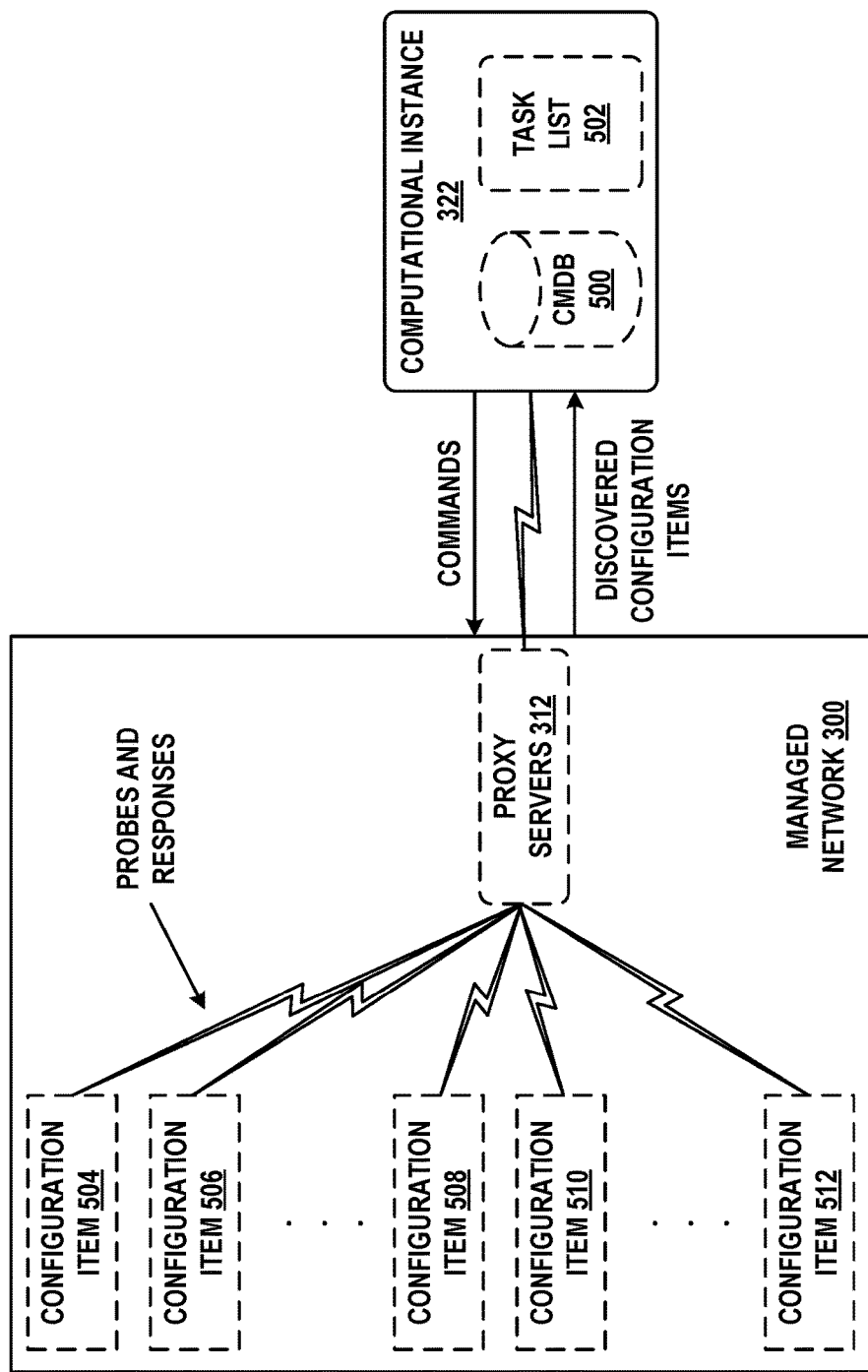
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
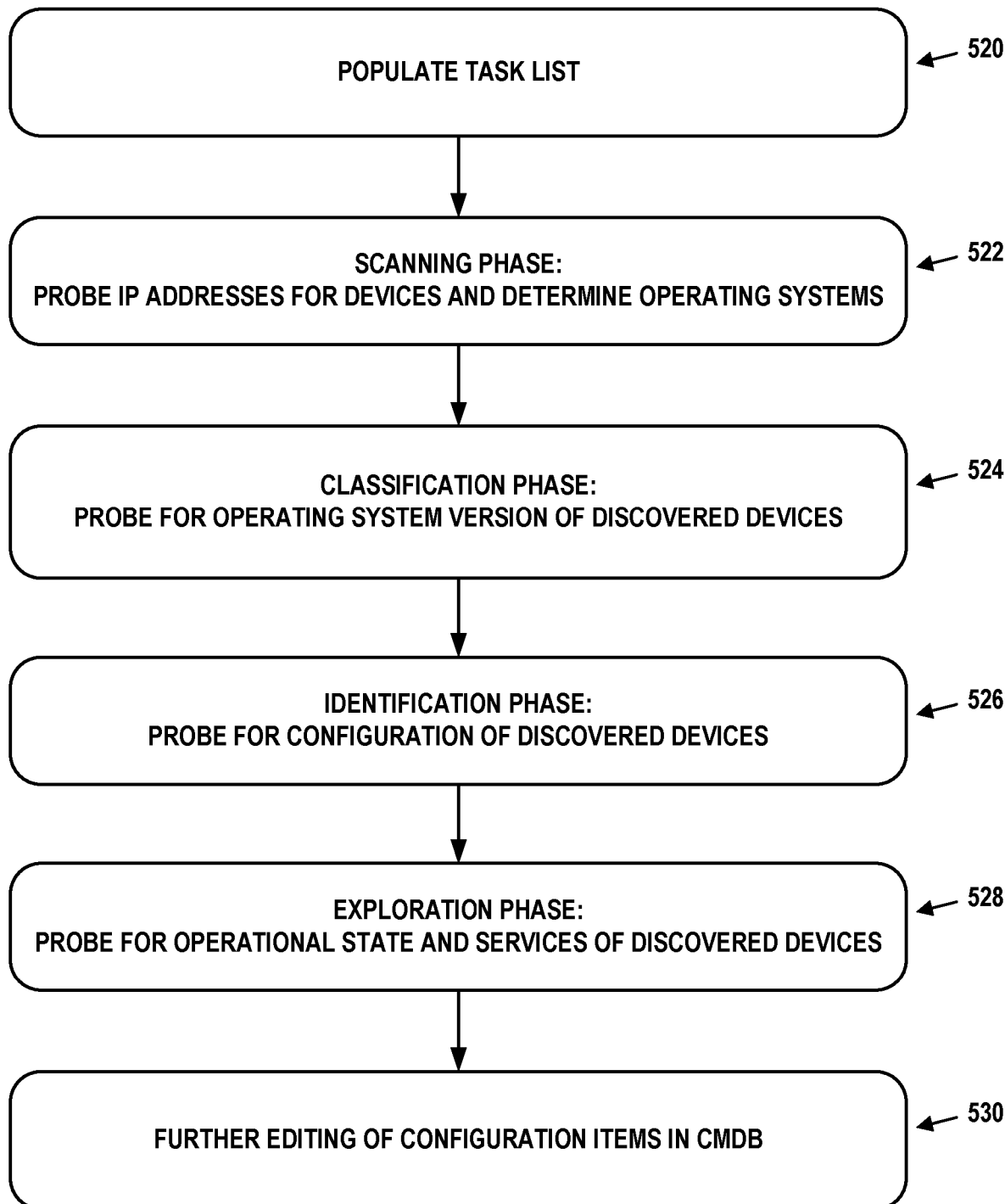
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Process-Based Discovery

Accurate and scalable discovery provides various benefits to a managed network such as managed network 300, including but not limited to, efficient management of software products in the managed network, identification and mitigation of malicious software and other security threats within the managed network, and monitoring the state of the managed network so that any issues therewith can be identified and adjustments can be made to meet desired performance specifications.

The speed, scalability, and coverage of discovery operations may be improved by selecting directories to be scanned for files and other resources based on applications that are executing on a computing device at a given point in time or over a given time window. That is, rather than following predetermined criteria in organizing or planning the discovery operations, the discovery operations may be targeted or focused on file system directories associated with executing applications. Thus, the discovery operations may scan file system directories likely to contain files of interest instead of indiscriminately scanning a large number of directories without knowing beforehand whether files of interest are contained therein. As a result, the discovery operations may involve scanning a small number of directories instead of scanning an entire file system tree of a computing device, thereby increasing the rate of discovery of configuration items and decreasing the amount of computing resources used in the process. This approach to discovery may be referred to herein as process-based discovery.

Process-based discovery may be facilitated by a proxy server application. The proxy server application may be disposed on a proxy server device (e.g., one of proxy servers 312) within the managed network 300, on the computing device undergoing discovery, or within the remote network management platform 320 configured to manage the managed network, among other possibilities. However, functions of the proxy server application may also be distributed among the proxy server device, the computing device undergoing discovery, or the remote network management platform. To that end, in some implementations, the proxy server application may include two or more modules distributed between the proxy server device, the computing device undergoing discovery, and/or computational instances of the remote network management platform. Thus, discovery may involve various modules of the proxy server application and/or various computing devices communicating with one another to gather and process the discovered configuration items.

Notably, a single process-based discovery scan might not discover files corresponding to software products that are not being executed at the time of discovery. Accordingly, the process-based discovery may be repeated periodically, at random time intervals, or in response to initiation of execution of an application to increase the probability of discovering as many configuration items as possible for a given computing device. Process-based discovery may, in some scenarios, expend fewer resources and take less time to execute than pattern-based discovery even when repeated over time to discover software products that may be executing at different times.

Process-based discovery for a client device within the managed network 300, such as one of client devices 302, may involve, in part, requesting that the client device identify applications executing thereon. For any identified applications of interest, directories associated with the application may be further identified. In one example, directories associated with a respective application may be identified by requesting that the client device determine and provide a working directory associated with the respective application (e.g., a directory in which an executable file associated with the respective application is stored). In another example, directories associated with the respective application may be identified by requesting that the client device determine and provide directories of any files accessed by the respective application or based on preconfigured directories. The identified directories may subsequently be scanned to discover files and their corresponding attributes. Additional processing may then occur with respect to these files and attributes in order to determine desired information.

Although process-based discovery can at times be more efficient than traditional discovery, each approach has its own advantages, and the two approaches may nevertheless be used in combination in some scenarios. For example, process-based discovery may be executed at a higher frequency than traditional discovery due to process-based discovery taking less time and resources to execute. On the other hand, traditional discovery may provide a more thorough coverage of directories containing software products that are executed infrequently or are not executed at all. Thus, a difference between configuration items discovered by process-based discovery and traditional discovery may be used to identify unused software products, thereby allowing the number of software licenses to be reduced and computing resources to be freed.

VI. Example Discovery of Devices Involved in Blockchain-Based Mining

The managed network 300 may at times encounter issues in which malicious or otherwise undesirable applications are installed and executed on computing devices in the managed network 300, such as an application used for blockchain-based mining ("mining, for short"). In some scenarios, a computing device executing such an application can be used on its own to engage in mining, although in other scenarios, a computing device executing such an application might function as a member of a blockchain-based mining pool—that is, a group of devices that are executing similar mining applications and that are sharing processing power in hopes of successfully mining (e.g., receiving cryptocurrency). In either case, a computing device that is executing a mining application may be referred to as a "miner," for short.

Mining can be a complex and intensive computational process. In a blockchain-based network, miners continuously work to group outstanding transactions into blocks and add the blocks to a blockchain. To add a new block to the blockchain, a miner may use a large extent of its local processing resources in a continuous effort to solve a complex mathematical problem. That is, using a hash function, the miner may continuously compute hashes of a block until the resulting hash meets certain requirements. If the miner successfully computes a hash for the block that meets these requirements before other miners are able to do so, thereby "solving" the block, the miner then adds the block to the blockchain. In the context of cryptocurrency, for example, the first miner to add a new block of cryptocurrency transactions to the blockchain might receive cryptocurrency as a reward, and thus miners may continuously compete with each other to add new blocks. This process may then be repeated for a subsequent block.

Due to the computational complexity and intensity of this process, a mining application, when executing on a computing device, may consume much of the computing device's local processing resources in the continuous effort to solve blocks. Indeed, the chances of solving a block might even be increased by increasing the extent of local processing resources consumed. In addition, mining may involve frequent transmission of large amounts of data between the computing device and a server device that is associated with mining. For example, such data may include transactions, notifications of completed blocks, and/or other information used to facilitate mining. Thus, the computing device may consume a large or otherwise undesirable portion of network bandwidth in the managed network 300. This may be particularly problematic when multiple computing devices in the managed network 300 are mining together in a mining pool and thereby even further increasing processing and bandwidth consumption.

There are various ways in which a mining application may come to be installed and executed on a computing device in the managed network 300. For example, the application may be intentionally installed and executed on the computing device by an owner of the computing device or other user associated with the managed network 300. Alternatively, the application may come to be installed on the computing device as the result of a cybersecurity breach and may secretly execute in the background of the computing device without user or administrator permission. Such a cybersecurity breach often results in multiple computing devices in a network being compromised and used as members of a mining pool.

As discussed above, process-based discovery, whether used in conjunction with pattern-based discovery or used on its own, can provide various benefits, such as decreasing the amount of time spent executing discovery of configuration items in the managed network 300 and decreasing the amount of computing resources used for discovery. Along these lines, the methods and systems described herein leverage certain aspects of process-based discovery to obtain similar benefits and to address the mining issue discussed above. In particular, the methods and systems described herein enable a proxy server application to identify computing devices within the managed network 300 that are involved in mining pools ("miners," for short), particularly by looking at particular information that can be obtained during discovery. Using these methods and systems, a proxy server application can identify miners either during discovery or after discovery has been performed—namely, by using the information obtained from the computing devices and stored in the CMDB 500.

Figure 6:
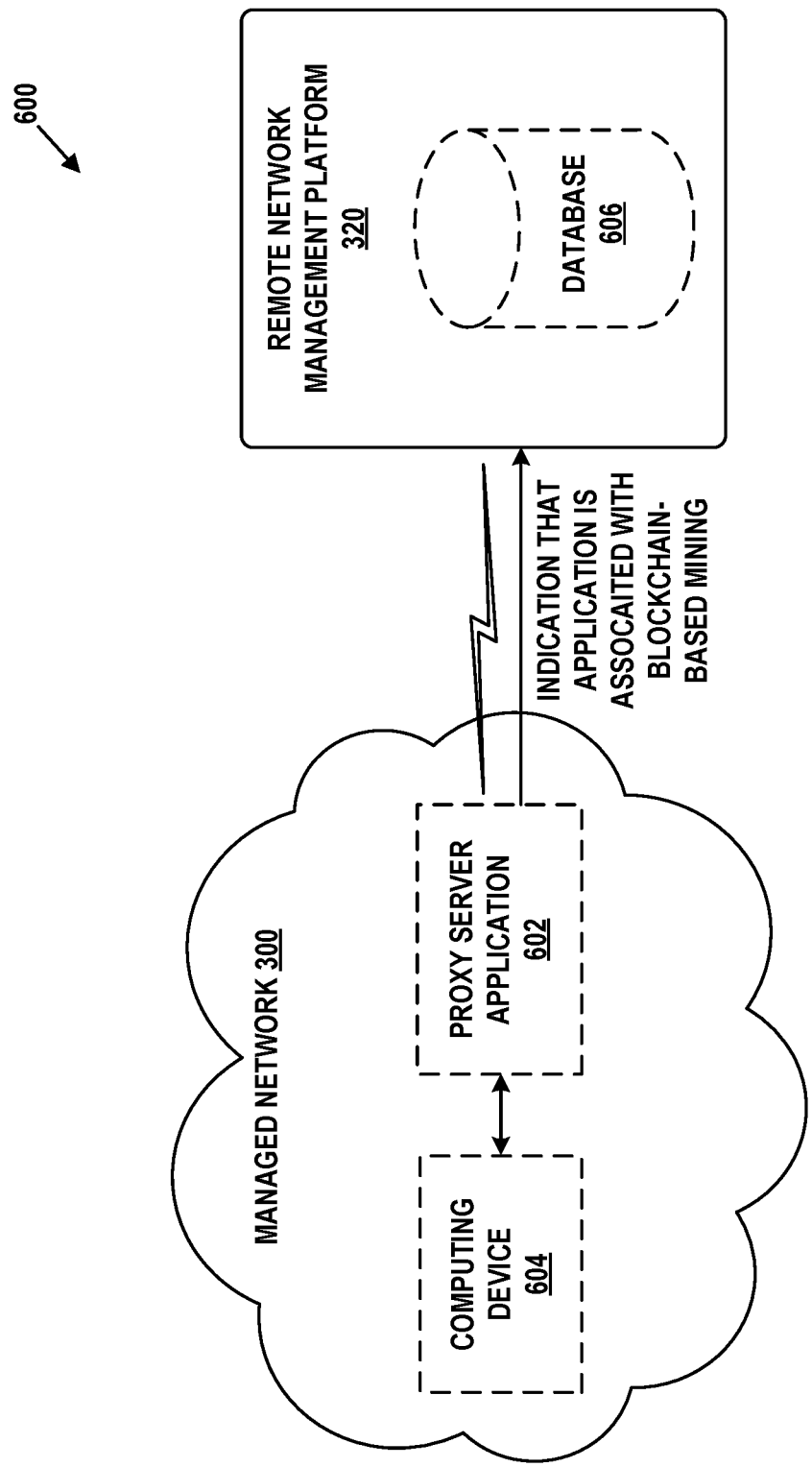
FIG. 6 depicts a computing system, in accordance with example embodiments.

FIG. 6 depicts an example computing system 600 that can be used to carry out various operations related to identifying miners. As shown, the computing system 600 includes a proxy server application 602 within managed network 300. Also shown within managed network 300 is a computing device 604, which could be any one of the client devices 302 or other computing devices of managed network 300 discussed above. Further, the proxy server application 602 is shown to be in communication with a database 606 disposed within the remote network management platform 320.

As noted above, process-based discovery, as well as other types of discovery, may be facilitated by a proxy server application, such as proxy server application 602. Proxy server application 602 is shown in FIG. 6 as a separate block from the computing device 604, but it should be understood that the proxy server application 602 may be disposed on a proxy server device within the managed network 300 (e.g., one of proxy servers 312), on the computing device 604, or within the remote network management platform 320, among other possibilities. Functions of the proxy server application 602 may also be distributed among the proxy server, the computing device 604, and/or computational instances of the remote network management platform 320.

Process-based discovery may involve proxy server application 602 transmitting to the computing device 604 a request to identify one or more applications executing on the computing device 604. This request may include one or more instructions invoking an operating system or operating system shell function configured to cause the operating system to provide information regarding any applications currently executing on the computing device 604. The instructions may be operating system-specific or operating system shell-specific, and may be generated by proxy server application 602 based on configuration items discovered at, for example, block 524 of FIG. 5B. In response to or based on reception of the request to identify processes executing on the computing device 604, the computing device 604 may be configured to execute the instructions contained in the request, thus identifying any applications executing thereon.

Based on or in response to identifying the executing applications, the computing device 604 can also be configured to transmit a list of the identified executing applications to proxy server application 602. The list can include data for each executing application, such as a command string used to invoke the application to execute on the computing device 604. In some implementations, the list may also include, for each executing application: a reference to the application, a user account from or by which execution of the application was initiated, and/or a start time of the execution of the application, among other possible data. A reference to an application can take various forms, such as a name of the application, a process identifier (PID) of the application, and/or another type of alphanumeric reference to the application. The PID of an application is a number used by various operating systems (e.g., UNIX® and WINDOWS®) to uniquely identify the application when the application is executing on a computing device.

The data associated with each application may vary with the operating system executed by the computing device 604 and the content of the request, among other factors. Namely, each operating system may provide a different default set of data associated with each application. The default data set may be modifiable to include more or less information about each application by including different parameters (e.g., flags) in the request.

FIG. 7 illustrates an example instruction that may be provided to the computing device 604 to carry out some of the operations discussed herein. The instruction is provided to the computing device 604 (i.e., computing_device_1) by way of an operating system shell (i.e., an interface configured to allow access to an operating system's services). Notably, the instruction shown in FIG. 7 corresponds to an operating system shell of a UNIX® or a UNIX®-like operating system (e.g., LINUX®). Different operating system-specific instructions may be used to perform similar operations on different operating systems such as, for example, WINDOWS® or MACOS®. The prompt "proxy_app@computing_device_1" on line 700 indicates that the computing device 604 is being remotely accessed by way of proxy server application 602 (i.e., proxy_app). Although a graphical representation of the input and output of the operating system shell is shown in FIG. 7 is for illustrative purposes, such graphical representations might not be displayed in practice. Rather, the information shown graphically may be transmitted between the computing device 604 and the proxy server application 602 by way of a network connection.

Line 700 of FIG. 7 indicates that the proxy server application 602 provided the instruction or command "ps" to the computing device 604. The "ps" instruction is configured to cause the operating system shell to report a snapshot of applications currently executing on a computing device. Accordingly, in response to the "ps" instruction, the computing device 604 is configured to generate an output at lines 701, 702, 703, 704, 705, 706, and 707 (i.e., lines 701-707) containing a list of applications currently executing on the computing device 604. As shown, the output may include, for each executing application, (i) the PID of the application, (ii) a user account under which the application is executing, (iii) a time at which execution of the application was initiated, and (iv) a command string used to initiate execution of the application (e.g., a name of the executable file along with any provided parameters). Notably, the "ps" command may be modified with various parameters to control the content of the output at lines 701-707, thereby causing the computing device 604 to provide more or less information than shown in FIG. 7. The list of identified applications, along with any data corresponding to each application, may be transmitted from the computing device 604 to the proxy server application 602.

The proxy server application 602 can refer to the list of executing applications (and/or any other information related to the executing applications) and identify any applications on the list that might be associated with mining. To facilitate this, in some implementations, the proxy server application 602 may have access to data representative of a plurality of identifiers, where each member of the plurality of identifiers is an identifier that is suspected or known to be associated with mining. For example, the plurality of identifiers can take the form of a plurality of network addresses (e.g., URLs) of suspected or known mining pools. Additionally or alternatively, the plurality of identifiers can take the form of a plurality of network addresses (e.g., IP addresses) of server devices suspected of or known to operate mining. Other examples are possible as well.

The plurality of identifiers may be stored at one or more locations, such as a database dedicated to a central instance of remote network management platform 320 and/or other databases. Further, the plurality of identifiers may be periodically updated to reflect any changes (e.g., adding an identifier of a new mining pool), and such updates may be published to, downloadable by, or otherwise made accessible to the proxy server application 602.

Using the plurality of identifiers, the proxy server application 602 can compare information from the list of executing applications to the plurality of identifiers. In particular, for a given application on the list, the proxy server application 602 can determine, from the list, the command string used to invoke the application on the computing device 604 and compare the command string to the plurality of identifiers. If the command string includes an identifier from the plurality of identifiers, this might indicate that the application is associated with mining. For example, referring to FIG. 7, the proxy server application 602 might determine that the command string in line 705 includes a network address, bc.mining.pool.com:3333, that is a member of a plurality of suspected or known mining pools. Other examples are possible as well.

Other techniques for identifying applications that are associated with mining are possible as well. For example, in some implementations, the proxy server application 602 can provide one or more instructions to the computing device 604 for the computing device 604 to identify information related to one or more communication sessions that are active (i.e., ongoing) on the computing device 604 and between the computing device 604 and respective server devices. Using this information, the proxy server application 602 can determine which, if any, of the server devices with which the computing device 604 is engaged in communication is a server device that is suspected or known to be associated with mining. Thus, the proxy server application 602 can determine or confirm whether the computing device 604 is involved in mining. The proxy server application 602 can also use this information in combination with the list of applications executing on the computing device 604 to determine for the first time, or to confirm, which application(s) executing on the computing device 604 is/are associated with mining.

The act of providing the one or more instructions to the computing device 604 for the computing device 604 to identify the information can involve the proxy server application 602 transmitting, to the computing device 604, a request including the instruction(s), similar to the manner discussed above or in a different manner. Additionally or alternatively, the proxy server application 602 can log on to the computing device 604 and invoke one or more commands to identify the information. The computing device 604 can then execute the instruction(s) and/or invoke the command(s), thus identifying the information related to one or more communication sessions that are active on the computing device 604.

Based on or in response to identifying the information, the computing device 604 can also be configured to transmit, to proxy server application 602, a list of the one or more active sessions. The list can include data for each active session, including but not limited to a network address (e.g., an IP address) of the respective server device for that session. In some implementations, the list may also include, for each active session: a name of the protocol used for the session (e.g., TCP), an IP address or other network address of the computing device 604, a time the session began, a duration of the session, a status of the session (e.g., TCP connection states, such as CLOSED, ESTABLISHED, LAST_ACK, LISTEN), and/or a reference to an application that is executing during, or otherwise associated with, the active session (e.g., a PID of the application, a name of the application, a port number known to be associated with the application, and/or another type of alphanumeric reference to the application), among other possible data. The data associated with each active session may vary with the operating system executed by the computing device 604, the content of the request/command, and/or other factors. Namely, each operating system may provide a different default set of data associated with each application. The default data set may be modifiable to include more or less information about each active session by including different parameters in the request/command.

FIG. 8 illustrates another example instruction that may be provided to the computing device 604 to carry out some of the operations discussed herein. Similar to the instruction shown in FIG. 7, the instruction shown in FIG. 8 corresponds to an operating system shell of a UNIX® or a UNIX®-like operating system (e.g., LINUX®), but different operating system-specific instructions may be used to perform similar operations on different operating systems. The prompt "proxy_app@computing_device_1" on line 800 indicates that the computing device 604 is being remotely accessed by way of proxy server application 602 (i.e., proxy_app). Although a graphical representation of the input and output of the operating system shell is shown in FIG. 8 is for illustrative purposes, such graphical representations might not be displayed in practice. Rather, the information shown graphically may be transmitted between the computing device 604 and the proxy server application 602 by way of a network connection.

Line 800 of FIG. 8 indicates that the proxy server application 602 provided the instruction or command "netstat" to the computing device 604. The "netstat" instruction is configured to cause the operating system shell to report a snapshot of active sessions between a computing device and respective server devices. Accordingly, in response to the "netstat" instruction, the computing device 604 is configured to generate an output at lines 801, 802, 803, 804, and 805 (i.e., lines 801-805) containing a list of currently active sessions on the computing device 604. As shown, the output may include, for each active session, (i) the protocol, (ii) a network address of the computing device 604 and the port number being used, (iii) a network address of a server device with which the computing device 604 is engaged in communication (if any), (iv) a status of the session, and (v) a PID of the application that is associated with the session. Notably, the "netstat" command may be modified with various parameters to control the content of the output at lines 801-805, thereby causing the computing device 604 to provide more or less information than shown in FIG. 8. The list of identified applications, along with any data corresponding to each application, may be transmitted from the computing device 604 to the proxy server application 602.

The proxy server application 602 can refer to the list of active sessions (and/or any other information related to the active sessions the proxy server application 602 might access) and identify any network addresses specified in the list that might be associated with mining. In some embodiments, for example, for a given active session on the list, the proxy server application 602 can determine, from the list, a network address of the server device with which the computing device 604 is communicating and compare the network address to a plurality of identifiers indicative of mining, such as the list containing network addresses of server devices suspected of or known to operate mining, as discussed above. As a more specific example, referring to FIG. 8, the proxy server application 602 might determine that the foreign IP address in line 803 is a member of a list of suspected or known server devices that operate mining. Other examples are possible as well.

In line with the discussion above, the proxy server application 602 can also use the list of active sessions in combination with the list of applications executing on the computing device 604 to determine or confirm which of the applications that are currently executing on the computing device 604 or have executed on the computing device 604 in the past are mining applications. That is, once the proxy server application 602 has determined that the computing device 604 has an active session with a server device known or suspected to operate mining, the proxy server application 602 can determine whether the information for that session includes a reference to any of the applications that are executing or have executed on the computing device 604. If so, it might indicate that the application is a mining application—particularly, a mining application used to access the server device that is operating mining.

Consider for example a scenario in which the list of active sessions includes an active session between the computing device 604 and a server device having a network address that is suspected or known to be associated with mining, such as the network address shown in line 803 of FIG. 8. The information for this active session might include a PID, port number, or other reference to an application that is listed as executing or having been executed on the computing device 604. For example, line 803 of FIG. 8 represents an active session where the PID is 4, and line 705 of FIG. 7 represents an executing application having a PID of 4. This might indicate that the application with the PID of 4 is a mining application being executed by the computing device 604. Further, because the command string in line 705 also includes a URL that is suspected or known to be associated with a mining pool, as discussed above, the identical PID values confirm that the computing device 604 is executing a mining application. Other examples are possible as well.

In some implementations, once the proxy server application 602 has used one or more of the techniques described above to identify a mining application, it might be desirable to have the proxy server application 602 perform various actions in response.

For example, the proxy server application 602 can store, in one or more databases, an indication that the application is associated with mining, such as a flag or other information that identifies the application as such. The database 606 shown in FIG. 6 is an example database that could be used for this purpose. In some implementations, the database 606 used for storing such indications and/or other associated information could be the CMDB 500. For example, storing the indication could involve updating a configuration item representative of the computing device 604 and/or application to indicate that the computing device 604 and/or application is associated with mining. Other examples are possible as well.

Additional actions that the proxy server application 602 might perform in response to one or both of the determinations described above, or at another point in time, will now be described. Although each such action is described as being performed on its own, any two or more of these actions could be performed in combination with each other in some scenarios.

As discussed above, mining can involve complex processing that utilizes a large amount of computer resources, and thus, high processing loads at the computing device 604 might help confirm whether the computing device 604 is involved in mining. Accordingly, based on one or both of the determinations described above, the proxy server application 602 can be configured to provide, to the computing device 604, one or more instructions to take a measurement of processor utilization of the computing device 604 and then store the measurement in the database 606 with the indication that the application is associated with mining. The measurement may take the form of a percentage, such as a percentage in a range of 0% to 100%, where a higher value indicates a greater extent of utilization. In some implementations, the instruction(s) can include instruction(s) to take a measurement that indicates a portion of the processor utilization that is attributable to the application. The computing device 604 may measure its own processor utilization and provide the measurement to the proxy server application 602.

Furthermore, mining also often involves transmission of large or otherwise undesirable amounts of network traffic between a computing device and a server device. Thus, additionally or alternatively to processor utilization, network traffic logs can be advantageously used to help confirm whether the computing device 604 is involved in mining. In particular, the proxy server application 602 can examine or analyze network traffic coming from or leaving the computing device 604, particularly traffic to an IP address, domain name, etc. of a server device suspected or known to be associated with mining.

To facilitate this, the proxy server application 602 can be configured to request and receive, from a network traffic database, network traffic logs contained in the network traffic database. The network traffic logs may include logs that a commercially-available network traffic analyzer collected and stored in the network traffic database. The network traffic logs can include representations of data packets that were transmitted between the computing device 604 and a server device. More particularly, any one or more of these representations might include various information from a session suspected to be associated with mining, such as an IP address used by the computing device 604, a port number used by the application, and an IP address used by the server device. Upon determining that the representation of one of such data packets includes the IP address used by the computing device 604, the port number used by the application, and the IP address used by the server device, the proxy server application 602 can store these IP addresses and the port number in the database 606 with the indication that the application is associated with mining. Further, the proxy server application 602 might then use this information as parameters for filtering the network traffic logs and obtaining additional information.

For example, in some implementations, the network traffic logs might specify data packet sizes (e.g., in bytes) and the proxy server application 602 can thus also use the network traffic logs to see how much data has been transmitted between the computing device 604 and a server device and see if the quantity of data exceeds a predefined threshold or is otherwise consistent with known quantities of data transmitted during mining. In particular, the proxy server application 602 can use the IP addresses and/or the port number noted above to determine, from the network traffic logs, a quantity of data that was transmitted between the computing device 604 and the server device, such as a quantity of data from a single session, a quantity of data during a particular period of time, or a total quantity of data. The IP addresses, for example, could be used to filter the network traffic logs for all traffic between the two IP addresses. The port number could then be used to find individual session information (e.g., a quantity of data transmitted during a single session).

The proxy server application 602 can then compare the quantity of data to known quantities of data historically exchanged between computing devices and server devices during mining and determine whether the quantity of data that was transmitted between the computing device 604 and the server device is within a threshold quantity of data of one or more of the known quantities of data. If so, the proxy server application 602 might store in the database 606, with the indication that the application is associated with mining, an indication of the quantity of data that was transmitted between the computing device 604 and the server device. In other implementations, the proxy server application 602 might store such an indication regardless of whether any threshold or other condition is met.

In some implementations, the proxy server application 602 can be configured to store, in the database 606, with the indication that the application is associated with mining, a network address (e.g., IP address) of the computing device, a reference to the application (e.g., a PID, port number, and/or other reference discussed above), the identifier of the mining pool, and/or any other information discussed herein.

In some scenarios, it can also be useful to notify various individuals in the managed network 300 when an application is associated with mining so that any such individual is aware and can perhaps take remedial action in response. Accordingly, in some implementations, the proxy server application 602 can transmit, to the computing device 604 itself and/or to a second computing device within the managed network 300, an alert message incorporating the indication that the application is associated with mining. The alert message can take various forms, such as an email message or short message service (SMS) message. Additionally or alternatively, transmission of the alert message can involve the proxy server application 602 transmitting, to the computing device 604 and/or to the second computing device, an instruction that, upon receipt by the computing device 604 and/or second computing device, causes the computing device 604 and/or the second computing device to automatically display a pop-up window or other graphical representation including the indication and any other information identifying the application and the computing device 604 as being associated with mining.

Moreover, in some scenarios, it may be useful to take immediate action to stop the application from using network bandwidth and computer resources. For example, the proxy server application 602 can provide, to the computing device 604, a command that causes the computing device 604 to terminate execution of the application. The act of providing such a command can involve transmitting the command to the computing device 604 and/or logging on to the computing device 604 and terminating execution of the application.

Additionally or alternatively, the proxy server application 602 can provide, to the computing device 604, a command that causes the computing device 604 to delete one or more executable files of the application and/or other files associated with the application. The act of providing such a command can involve transmitting the command to the computing device 604 and/or logging on to the computing device 604 and deleting one or more executable files of the application. To facilitate this, the proxy server application 602 might have access to data (e.g., data obtained during discovery) that indicates the directory path of the executable file(s). Additionally or alternatively, the proxy server application 602 might be preconfigured with specific instructions that indicate which directories, executable files, and/or other files should be deleted for mining applications. For example, one such instruction might correlate a particular mining application with a particular directory path where executable files are expected or known to be located, and thus, the instruction can be used to delete those executable files.

Another action that the proxy server application 602 could take in response to identifying a mining application is to configure a firewall of the managed network 300 (e.g., firewall 310) to block computing device or enterprise access to (i) the IP address of the mining pool or (ii) the IP address and the port number used by the mining pool.

VII. Example Operations

Figure 9:
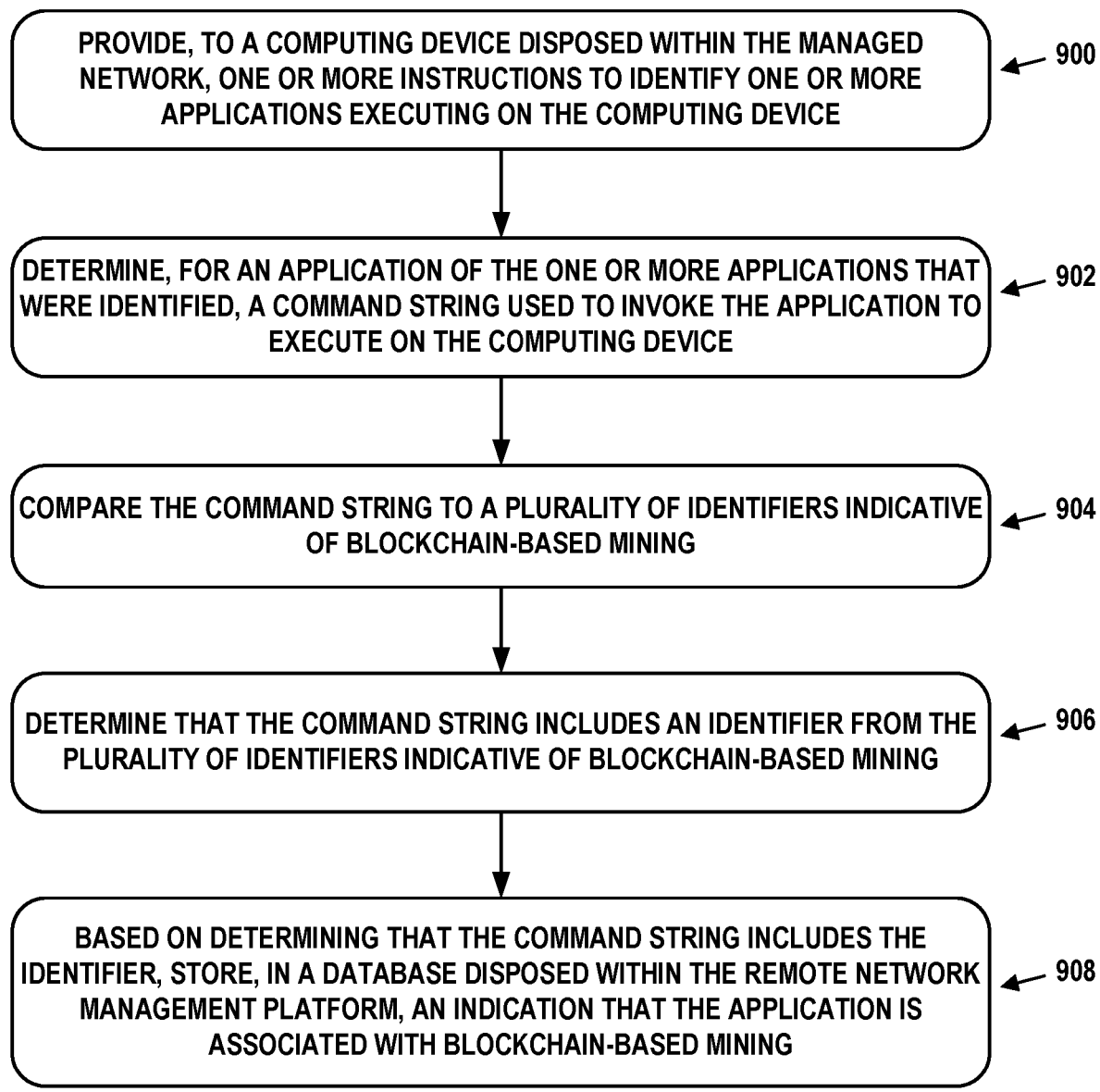
FIG. 9 is a flow chart, in accordance with example embodiments.
Figure 10:
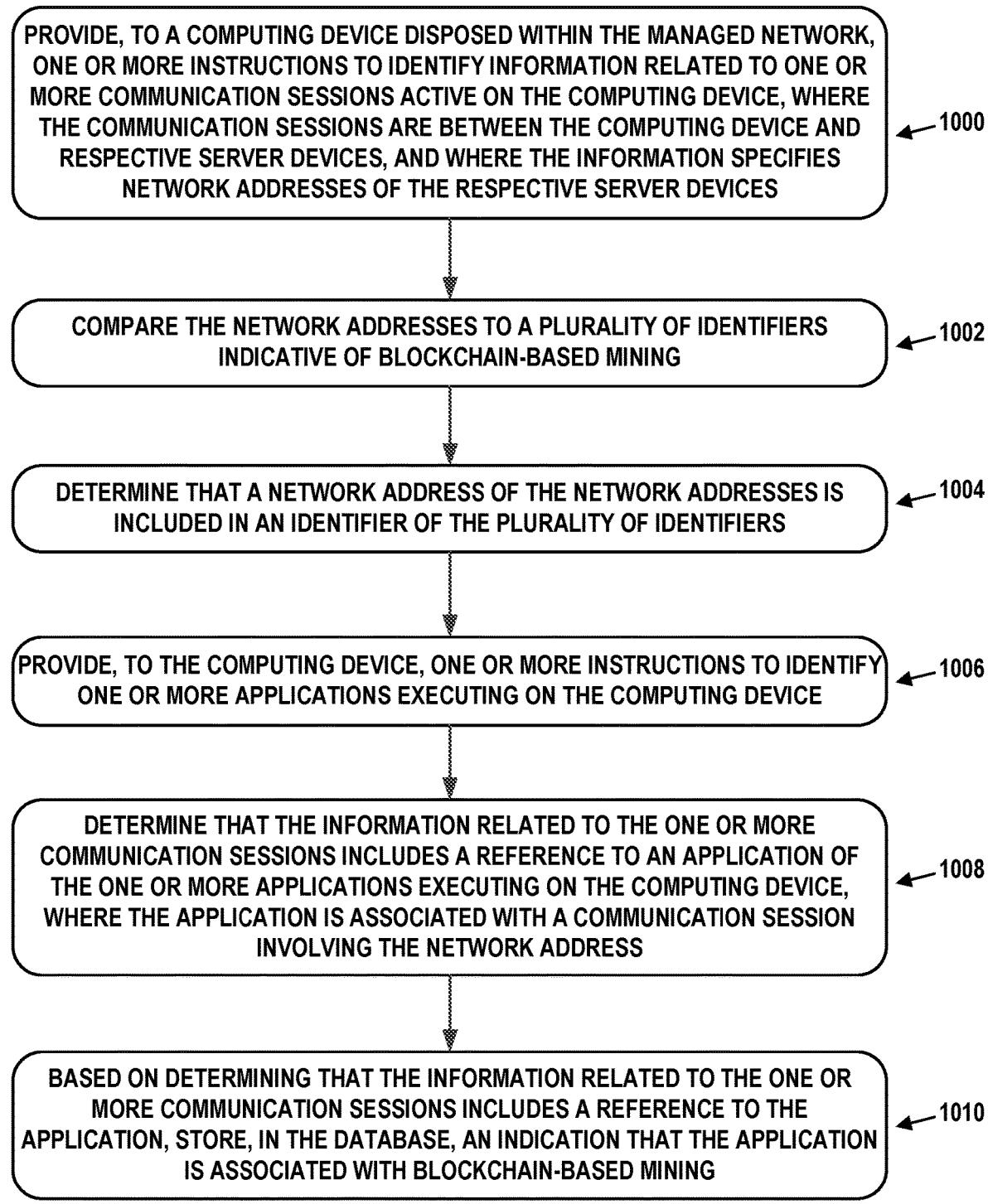
FIG. 10 is another flow chart, in accordance with example embodiments.

FIG. 9 and FIG. 10 are flow charts illustrating example embodiments. The processes illustrated by FIG. 9 and FIG. 10 may be carried out by a computing device, such as computing device 100, a cluster of computing devices, such as server cluster 200, and/or a software application executing on a computing device or computing devices, such as proxy server application 602. However, the process can be carried out by other types of applications, devices, or device subsystems. For example, the process could be carried out by a portable computer, such as a laptop or a tablet device.

The embodiments of FIG. 9 and FIG. 10 may be simplified by the removal of any one or more of the features shown therein. Further, these embodiments may be combined with features, aspects, and/or implementations of any of the previous figures or otherwise described herein.

Referring to FIG. 9, block 900 involves providing, to a computing device disposed within the managed network, one or more instructions to identify one or more applications executing on the computing device.

Block 902 involves determining, for an application of the one or more applications that were identified, a command string used to invoke the application to execute on the computing device.

Block 904 involves comparing the command string to a plurality of identifiers indicative of blockchain-based mining.

Block 906 involves determining that the command string includes an identifier from the plurality of identifiers indicative of blockchain-based mining.

Block 908 involves, based on determining that the command string includes the identifier, storing, in a database disposed within the remote network management platform, an indication that the application is associated with blockchain-based mining.

In some embodiments, the identifier may refer to a network address of a blockchain-based mining pool, and the indication that the application is associated with blockchain-based mining may include the network address of the blockchain-based mining pool.

In some embodiments, the plurality of identifiers may comprise network addresses of server devices suspected of or known to operate blockchain-based mining. In such embodiments, the act of determining that the command string includes the identifier may involve determining that the command string includes one of the network addresses.

In some embodiments, the process may also involve storing, in the database, with the indication that the application is associated with blockchain-based mining, a network address of the computing device, a reference to the application, and the identifier.

In some embodiments, the process may also involve, based on determining that the command string includes the identifier, providing, to the computing device, one or more instructions to take a measurement of processor utilization of the computing device and storing, in the database, with the indication that the application is associated with blockchain-based mining, the measurement of the processor utilization. In such embodiments, the measurement of the processor utilization might include a portion of the processor utilization attributable to the application.

In some embodiments, the process may also involve requesting and receiving, from a network traffic database, network traffic logs contained in the network traffic database. The network traffic logs may include representations of data packets that were transmitted between the computing device and a server device. Further, in such embodiments, the process may involve determining that a representation of one of the data packets includes: an IP address used by the computing device, a port number used by the application, and an IP address used by the server device. Still further, in such embodiments, the process may involve storing, in the database, with the indication that the application is associated with blockchain-based mining, the IP address used by the computing device, the port number used by the application, and the IP address used by the server device.

In embodiments such as those described above as involving network traffic logs, the process may also involve: using the IP address used by the computing device, the port number used by the application, and the IP address used by the server device, determining, from the network traffic logs, a quantity of data that was transmitted between the computing device and the server device; comparing the quantity of data that was transmitted between the computing device and the server device to quantities of data historically exchanged between computing devices and server devices during blockchain-based mining; determining that the quantity of data that was transmitted between the computing device and the server device is within a threshold quantity of data of one or more of the quantities of data historically exchanged between computing devices and server devices during blockchain-based mining; and store, in the database, with the indication that the application is associated with blockchain-based mining, an indication of the quantity of data that was transmitted between the computing device and the server device.

In some embodiments, the process may also involve, based on determining that the command string includes the identifier, provide, to the computing device, a command that causes the computing device to terminate execution of the application.

In some embodiments, the process may also involve, based on determining that the command string includes the identifier, provide, to the computing device, a command that causes the computing device to delete one or more executable files of the application.

In some embodiments, the process may also involve, based on determining that the command string includes the identifier, transmit, to a second computing device within the managed network, an alert message incorporating at least part of the indication.

FIG. 10 next depicts another process for identifying applications that are associated with mining. This process could be performed in addition to or alternatively to the process depicted by FIG. 9.

In FIG. 10, block 1000 involves providing, to a computing device disposed within the managed network, one or more instructions to identify information related to one or more communication sessions active on the computing device, where the communication sessions are between the computing device and respective server devices, and where the information specifies network addresses of the respective server devices.

Block 1002 involves comparing the network addresses to a plurality of identifiers indicative of blockchain-based mining.

Block 1004 involves determining that a network address of the network addresses is included in an identifier of the plurality of identifiers.

Block 1006 involves providing, to the computing device, one or more instructions to identify one or more applications executing on the computing device.

Block 1008 involves determining that the information related to the one or more communication sessions includes a reference to an application of the one or more applications executing on the computing device, where the application is associated with a communication session involving the network address.

Block 1010 involves based on determining that the information related to the one or more communication sessions includes a reference to the application, storing, in the database, an indication that the application is associated with blockchain-based mining.

In some embodiments, the process may also involve storing, in the database, with the indication that the application is associated with blockchain-based mining, the reference to the application.

In some embodiments, the identifier may refer to a network address of a blockchain-based mining pool, and the indication that the application is associated with blockchain-based mining may include the network address of the blockchain-based mining pool.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a database disposed within a remote network management platform that is associated with a managed network; and
a proxy server application disposed within the managed network, wherein the proxy server application is controlled by the remote network management platform, and wherein the proxy server application is configured to:
provide, to a computing device disposed within the managed network, one or more instructions to identify one or more applications executing on the computing device;
determine, for an application, a command string used to invoke the application to execute on the computing device;
compare the command string to a uniform resource locator (URL) of a blockchain-based mining pool, wherein the blockchain-based mining pool corresponds to a plurality of applications respectively executing on a plurality of computing devices, and wherein the plurality of applications are configured to share processing resources to mine cryptocurrency at least in part by computing a hash for a respective block of a respective blockchain;
determine that the command string includes the URL;
based on determining that the command string includes the URL, provide, to the computing device, one or more additional instructions to perform a measurement of a current processor utilization of the computing device;
determine that the current processor utilization is indicative that the application is associated with the blockchain-based mining pool; and
based on determining that the current processor utilization indicates that the application is associated with the blockchain-based mining pool, store, in the database, an indication that the application is associated with the blockchain-based mining pool.

2. The computing system of claim 1, wherein the URL comprises a network address, and wherein the indication that the application is associated with the blockchain-based mining pool includes an indication of the network address.

3. The computing system of claim 1, wherein the proxy server application is configured to:
store, in the database, with the indication that the application is associated with the blockchain-based mining pool, a network address of the computing device, a reference to the application, and the URL.

4. The computing system of claim 1, wherein the proxy server application is configured to:

store, in the database, with the indication that the application is associated with the blockchain-based mining pool, an indication of the current processor utilization.

5. The computing system of claim 4, wherein the indication of the current processor utilization includes a portion of the current processor utilization attributable to the application.

6. The computing system of claim 1, wherein the proxy server application is configured to:
request and receive, from a network traffic database, network traffic logs contained in the network traffic database, wherein the network traffic logs include representations of data packets that were transmitted between the computing device and a server device;
determine that a representation of one of the data packets includes: an Internet Protocol (IP) address used by the computing device, a port number used by the application, and an IP address used by the server device; and
store, in the database, with the indication that the application is associated with the blockchain-based mining pool, the IP address used by the computing device, the port number used by the application, and the IP address used by the server device.

7. The computing system of claim 6, wherein the proxy server application is configured to:
using the IP address used by the computing device, the port number used by the application, and the IP address used by the server device, determine, from the network traffic logs, a quantity of data that was transmitted between the computing device and the server device;
determine that the quantity of data that was transmitted between the computing device and the server device is within a threshold quantity of data of one or more of the quantities of data historically exchanged between computing devices and server devices during blockchain-based mining; and
in response to determining that the quantity of data that was transmitted between the computing device and the server device is within the threshold quantity of data, store, in the database, with the indication that the application is associated with blockchain-based mining, an indication of the quantity of data that was transmitted between the computing device and the server device.

8. The computing system of claim 1, wherein the proxy server application is configured to:
based on determining that the command string includes the URL, provide, to the computing device, a command that causes the computing device to terminate execution of the application.

9. The computing system of claim 1, wherein the proxy server application is configured to:
based on determining that the command string includes the URL, provide, to the computing device, a command that causes the computing device to delete the executable file of the application.

10. The computing system of claim 1, wherein the proxy server application is configured to:
based on determining that the command string includes the URL, transmit, to a second computing device within the managed network, an alert message incorporating at least part of the indication.

11. A method performed by a proxy server application disposed within a managed network, wherein the proxy server application is controlled by a remote network management platform associated with the managed network, the method comprising:

providing, to a computing device disposed within the managed network, one or more instructions to identify one or more applications executing on the computing device and to measure a current processor utilization of the computing device;
determining, for an application of the one or more applications that were identified, a command string used to invoke the application to execute on the computing device;
comparing the command string to a uniform resource locator (URL) of a blockchain-based mining pool, wherein the blockchain-based mining pool corresponds to a plurality of applications respectively executing on a plurality of computing devices, and wherein the plurality of applications are configured to share processing resources to mine cryptocurrency at least in part by computing a hash for a respective block of a respective blockchain;
determining that the command string includes the URL;
based on determining that the command string includes the URL, determining that the current processor utilization is indicative that the application is associated with the blockchain-based mining pool; and
based on determining that the current processor utilization indicates that the application is associated with the blockchain-based mining pool, storing, in a database disposed within the remote network management platform, an indication that the application is associated with the blockchain-based mining pool.

12. The method of claim 11, wherein the URL comprises a network address, and wherein the indication that the application is associated with blockchain-based mining includes an indication of the network address.

13. The method of claim 11, comprising:
storing, in the database, with the indication that the application is associated with the blockchain-based mining pool, a network address of the computing device, a reference to the application, and the URL.

14. The method of claim 11, comprising:
storing, in the database, with the indication that the application is associated with the blockchain-based mining pool, an indication of the current processor utilization.

15. The method of claim 11, comprising:
based on determining that the command string includes the URL, transmitting, to a second computing device within the managed network, an alert message incorporating at least part of the indication.

16. A computing system comprising:
a database disposed within a remote network management platform that is associated with a managed network; and
a proxy server application disposed within the managed network, wherein the proxy server application is controlled by the remote network management platform, and wherein the proxy server application is configured to:
provide, to a computing device disposed within the managed network, one or more instructions to identify information related to one or more communication sessions active on the computing device, wherein the one or more communication sessions are between the computing device and respective server devices, and wherein the information specifies network addresses of the respective server devices and process identifiers (PIDs) for each communication session of the one or more communication sessions;

compare the network addresses of the respective server devices to a plurality of identifiers indicative of respective server devices used for blockchain-based mining;

determine that a network address of the network addresses of the respective server devices is included in a respective identifier of the plurality of identifiers indicative of the respective server devices used for blockchain-based mining;

in response to determining that the network address is included in the respective identifier, provide, to the computing device, one or more instructions to identify PIDs for one or more applications executing on the computing device and to measure a current processor utilization of the computing device;

determine that a respective PID of a respective communication session of the one or more communication sessions matches a respective PID of a respective application of the one or more applications executing on the computing device;

comparing a command string used to execute the respective application to a uniform resource locator (URL) of a blockchain-based mining pool to determine that the command string used to execute the respective application comprises the URL;

based on determining that the respective PID of the respective communication session matches the respective PID of the respective application and that the command string used to execute the respective application comprises the URL, determine that the current processor utilization of the computing device is greater than an expected amount of processor utilization; and based on determining that the current processor utilization is greater than the expected amount of processor utilization, store, in the database, an indication that the application is associated with the blockchain-based mining pool.

17. The computing system of claim 16, wherein the proxy server application is configured to:

store, in the database, with the indication that the application is associated with the blockchain-based mining pool, the respective PID of the application and an indication of the current processor utilization.

18. The computing system of claim 16, wherein the indication that the application is associated with the blockchain-based mining pool includes an indication of the current processor utilization.

19. The computing system of claim 16, wherein the blockchain-based mining pool corresponds to a plurality of applications respectively executing on a plurality of computing devices, and wherein the plurality of applications are configured to share processing resources to mine cryptocurrency at least in part by computing a hash for a respective block of a respective blockchain.

* * * * *